United States Patent [19]
Yoneda et al.

[11] Patent Number: 5,590,183
[45] Date of Patent: Dec. 31, 1996

[54] KEEP CALL BACK DEVICE

[75] Inventors: Norihiro Yoneda; Toshimitsu Ohba; Reiko Furuya; Kiyotaka Shikata, all of Kawasaki, Japan

[73] Assignee: Fujitsu Limited, Kanagawa, Japan

[21] Appl. No.: 342,245

[22] Filed: Nov. 18, 1994

[30] Foreign Application Priority Data

Mar. 18, 1994 [JP] Japan .................... 6-087120

[51] Int. Cl.6 .................... H04M 1/56; H04M 15/06; H04M 3/42
[52] U.S. Cl. .................... 379/142; 379/209; 379/215; 379/210
[58] Field of Search .................... 379/142, 210, 379/212, 201, 162, 265, 266, 157, 215, 216, 208, 207

[56] References Cited

U.S. PATENT DOCUMENTS

| | | | |
|---|---|---|---|
| 5,311,574 | 5/1994 | Livanos | 379/142 X |
| 5,323,444 | 6/1994 | Ertz et al. | 379/142 X |
| 5,436,967 | 7/1995 | Hanson | 379/266 |

FOREIGN PATENT DOCUMENTS

| | | |
|---|---|---|
| 311856 | 1/1991 | Japan . |
| 4152747 | 5/1992 | Japan . |

Primary Examiner—Wellington Chin
Assistant Examiner—Pal Loomis

[57] ABSTRACT

A keep call back device for connecting calls between subscribers includes a first call establishing portion for establishing a first call by connecting a call received from a calling terminal to a called terminal when it recognizes the call from the calling terminal which is able to respond to a call from one terminal without ending communication with another terminal during communication with another terminal, a second call establishing portion for establishing a second call by placing a call to the calling terminal after the first call has been established, and a call releasing portion for releasing the first call by disconnecting the same when the second call is established.

9 Claims, 11 Drawing Sheets

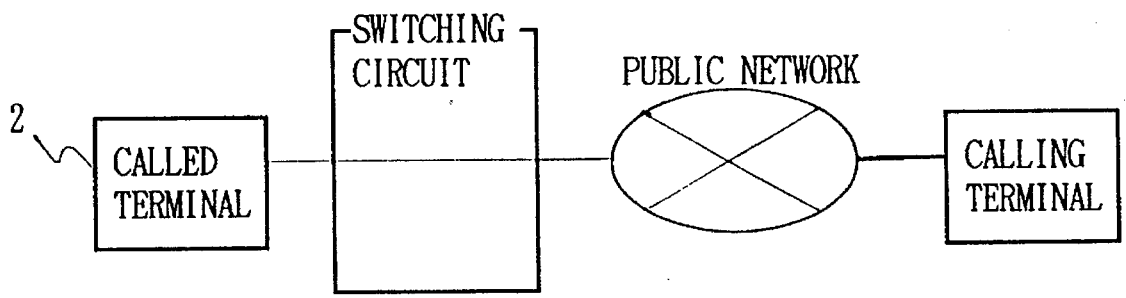
F I G. 5
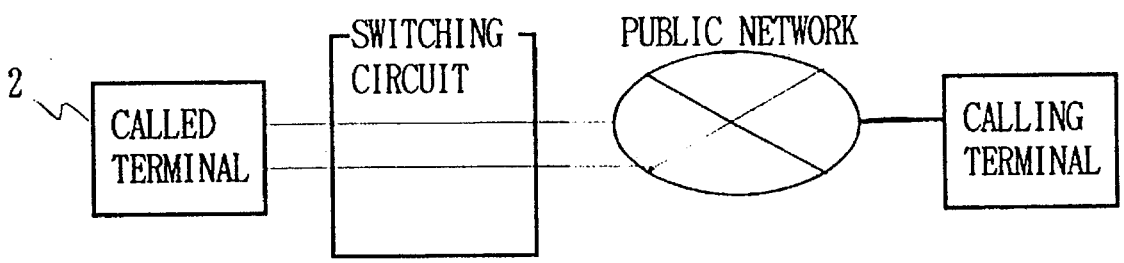
F I G. 6
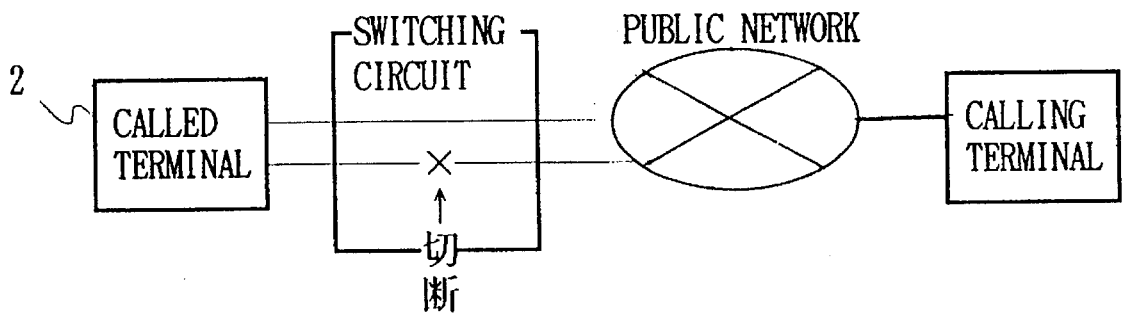
F I G. 7

KEEP CALL BACK DEVICE

BACKGROUND OF THE INVENTION

1. Field of the Invention

The present invention relates to a keep call back device for connecting a call from a called subscriber to a calling subscriber after connecting the call from the calling subscriber to the called subscriber.

2. Description of the Related Arts

Recently, there are increasing demands for higher information transmission speed. One of effective means for speeding up the transmission of information is telephone communication. Telephone communication has become essential in both public and private lives. In addition, various services utilizing telephone communication have widely spread. For example, such services include shopping over telephone lines and reservations for concert tickets, golf courses and hotel rooms over telephone lines. Such services allow a buyer to buy a merchandise or the like without visiting the shop.

Under such circumstances, it is expected that there will be an increase in communication cost for buyers. In order to save the communication cost for subscribers, various methods have been proposed.

For example, there is a method wherein a call is temporarily disconnected after the communication is established and the seller then calls back the buyer (call back method). Such a call back process allows the communication cost which is otherwise borne only by the buyer to be shared between the seller and the buyer.

In the case of telephone shopping, it is desired that sellers bear communication cost in order to improve their services. Then, services have been introduced wherein sellers register dedicated telephone numbers at the network side and are charged for calls from buyers to the dedicated telephone numbers.

Japanese unexamined patent publication (Kokai) No. H01-044659 discloses a telephone set having a call back function wherein the telephone number of a caller is stored at a called party and, during the call, a call is placed back to the caller over another communication channel. Such a telephone set is an invention effective in an ISDN (Integrated Services Digital Network) wherein the called party is notified of the telephone number of the caller when he or she receives the call and wherein a single telephone set can be connected to a plurality of communication channels.

In the method wherein the called terminal calls back the calling terminal after the established call is once released, the called subscriber must perform steps of temporarily disconnecting the call after confirming the telephone number of the calling subscriber and placing a call to the subscriber who has placed the first call using that telephone number. On the other hand, the subscriber who has placed the first call must wait for the call back for an indefinite period of time after the first call is disconnected.

The service of tolling a called party using a dedicated phone number for the called party is provided without confirming the calling subscriber. As a result, a subscriber who is not going to buy a product can illegally place a call. There is an additional problem in that the cost for the communication established as a result of such an illegal call is charged to the called subscriber.

The method described in Japanese unexamined patent publication No. H01-044659 has another problem in that it is effective only for networks such as ISDN networks wherein a single subscriber can be connected to a plurality of different communication channels and is not applicable to networks wherein a single subscriber can be connected to only one communication channel.

SUMMARY OF THE INVENTION

It is an object of the present invention to provide a device which makes it possible to eliminate the waiting time at a calling subscriber and allows tolling to be efficiently carried out by preventing illegal calls.

It is another object of the present invention to provide a technique for allowing a call back to the calling terminal to which only one communication channel can be set such as in an analog telephone network without waiting time.

In a keep call back device according to the present invention, a call detecting means detects when a call is placed to a called terminal and determines the telephone number of the calling terminal. The call detecting means then registers the telephone number of the calling terminal in an incoming telephone number storing means.

At this time, a first call establishing means establishes a first call by connecting a call received from the calling terminal to the called terminal.

After the first call is established, a second call establishing means reads the telephone number of the calling terminal 1 from an incoming telephone number list and places a call to the calling terminal 1 using that number.

When the call from the second call establishing means is answered by the calling party, the second call establishing means establishes a second call by connecting the second call between the calling and called terminals.

Then, a call releasing means releases the first call by disconnecting the first call after confirming that the second call has been established.

Thus, a call back process can be performed without disconnecting the call from the calling terminal. In addition, the subscribers do not need to perform complicated operations, and the calling subscriber does not need to wait for the call from the called subscriber.

A keep call back device according to the present invention has an incoming telephone number list on which the telephone numbers of particular calling terminals are registered and a subscriber identification information registering means for registering information to identify the particular calling subscribers. The keep call back device performs the keep call back process only for the calling terminals registered in the incoming telephone number list or the calling subscribers registered in the subscriber identification information registering means.

The keep call back device can be adapted to perform the keep call back process only when requested by the called terminal.

This makes it possible to prevent the keep call back process from being performed for a subscriber who has placed an illegal call, thereby improving security.

As described above, with a keep call back device according to the present invention, a calling subscriber can be called back by the called party without complicated operations. In addition, it is possible to smoothly perform switching between the communication channels set by requests from the calling and called parties, thereby allowing the switching of the party to be tolled to be carried out smoothly.

Since the keep call back device performs the call back process after the called subscriber confirms the calling subscriber, it is possible to eliminate improper call back requests.

BRIEF DESCRIPTION OF THE DRAWINGS

FIG. 5 shows a first example of the operation of a switching circuit;

FIG. 6 shows a second example of the operation of a switching circuit;

FIG. 7 shows a third example of the operation of a switching circuit;

Figure 15:
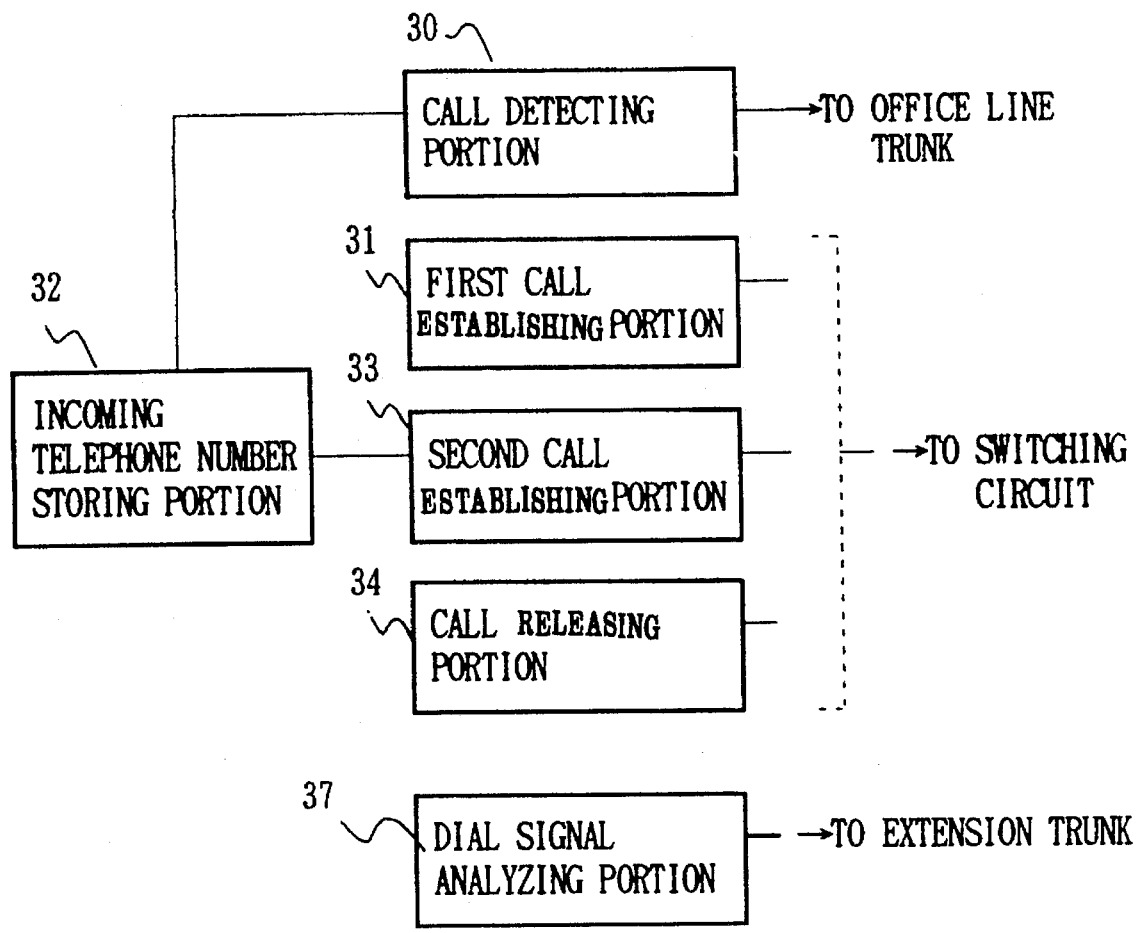

Fig, 14 is a block diagram showing each function of a keep call back device according to a fifth embodiment of the present invention;

FIG. 15 is a block diagram showing each function of a keep call back device according to a sixth embodiment of the present invention.

DETAILED DESCRIPTION OF THE PREFERRED EMBODIMENTS

Preferred embodiments of the present invention will now be described.

Figure 1:
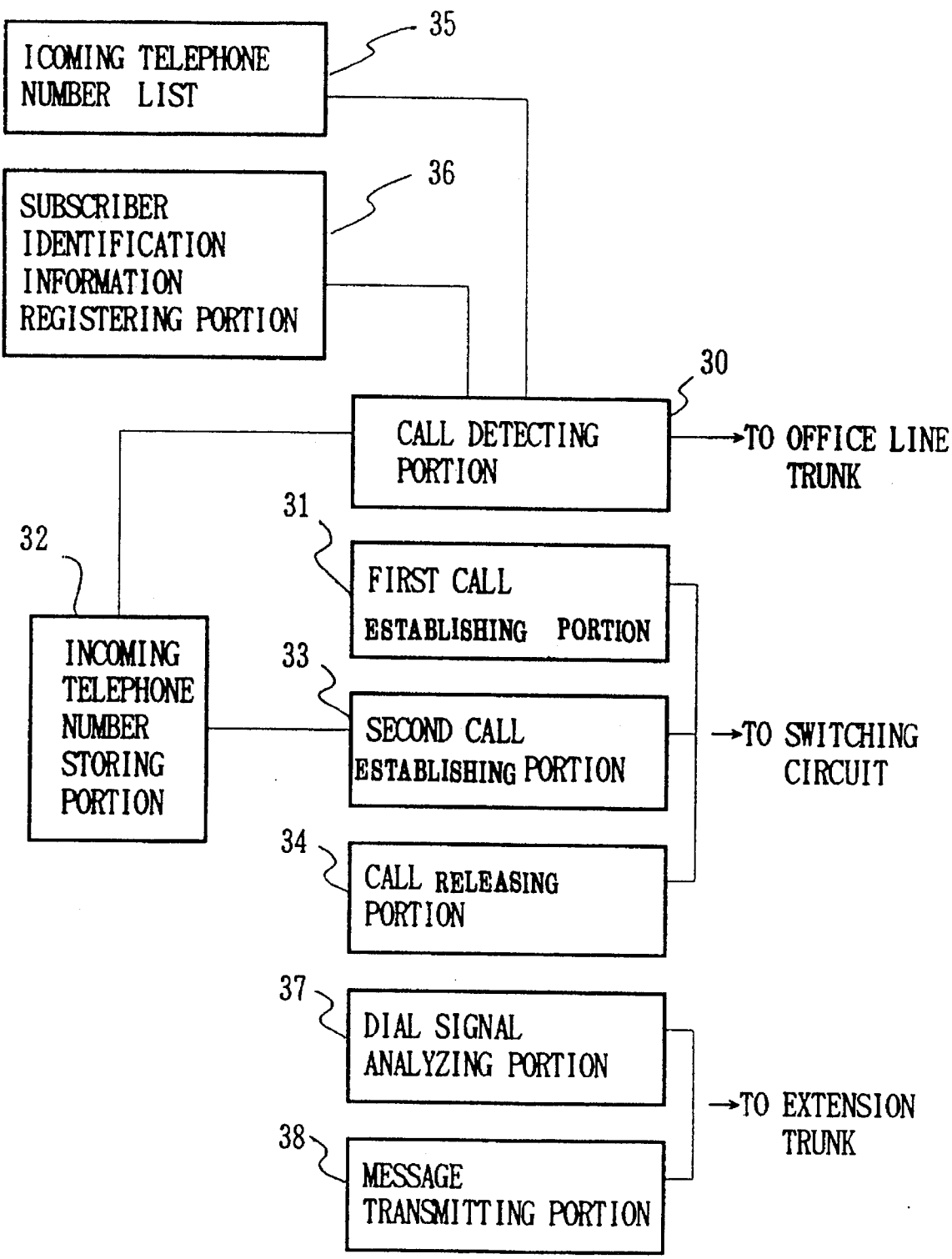
FIG. 1 is a block diagram illustrating the function and configuration of a keep call back device according to a first embodiment of the present invention.

A keep call back device according to a first embodiment of the present invention will be described with reference to FIG. 1.

The keep call back device includes a first call establishing portion 31, a second call establishing portion 33, a call releasing portion 34, a call detecting portion 30, an incoming telephone number storing portion 32 and an incoming telephone number list 35.

The first call releasing portion 31 has a function of causing a called terminal 2 to receive a call from a calling terminal 1 when it recognizes the call and connecting a first call between the calling terminal 1 and the called terminal 2.

The second call establishing portion 33 places a call to the calling subscriber 1 over a communication channel which is different from the channel of the first call after the first call is established. The second call establishing portion 33 has a function of setting a second call by connecting the second call between the calling terminal 1 and the called terminal 2.

The call releasing portion 34 has a function of releasing the first call by disconnecting the first call when the second call is established.

The call detecting portion 30 has a function of detecting the telephone number of the calling terminal 1 when a call to the called terminal 2 is detected.

The incoming telephone number storing portion 32 registers the telephone number detected by the call detecting portion 30. In placing the second call, the second call establishing portion 33 accesses the incoming telephone number storing portion 32 and reads the telephone number of the calling terminal 1. The second call establishing portion 33 then places the second call to the calling terminal 1 according to the read telephone number.

The incoming telephone number list 35 holds the telephone numbers of particular calling terminals 1 which have been registered in advance.

The call detecting portion 30 determines whether or not the telephone number of the calling terminal 1 is registered in the incoming telephone number list 35 and, only if the number is registered, registers the telephone number of the calling terminal 1 in the incoming telephone number storing portion 32.

It is assumed that the calling terminal 1 of the present embodiment has a call waiting function wherein it can respond to a call from a party B without ending communication with a party A during communication with the party A. This allows the calling terminal 1 to responds to the second call while keeping the called party 2 waiting when it receives the second call during communication with the called party 2 using the first call.

The operation of the keep call back device will now be described.

The keep call back device in this first embodiment activates the first call establishing portion 31 and the call detecting portion 30 when it recognizes a call to the called terminal 2.

The first call establishing portion 31 first causes the called terminal 2 to receive the call to establish a first call.

The call detecting portion 30 detects the telephone number of the terminal 1 which has placed the call. Then, the call detecting portion 30 looks up the incoming telephone number list 35 to determine whether or not the telephone number of the calling terminal 1 is registered. If the telephone number of the calling terminal 1 is registered in the incoming telephone number list 35, the call detecting portion 30 registers the telephone number of the calling terminal 1 in the incoming telephone number storing portion 32.

Next, the second call establishing portion 33 looks up the incoming telephone number storing portion 32 to detect the telephone number of the calling terminal 1. The second call establishing portion 33 then places a call to the calling terminal 1 according to that number. If the calling terminal 1 responds to this call, the second call establishing portion 33 establishes a second call between the calling terminal 1 and the called terminal 2.

When the establishing of the second call is complete, the call releasing portion 34 releases the first call which has been established between the calling terminal 1 and the called terminal 2.

Instead of the incoming telephone number list 35, there may be provided a subscriber identification information registering portion 36 in which information for identifying particular subscribers is registered.

The second call establishing portion 33 may be adapted to establish the second call only when it receives a request for keep call back from the called terminal 2. Such a request for establishing the second call is, for example, a dial signal representing a predetermined number. In this case, the keep call back device is provided with a dial signal analyzing portion 37 for detecting the dial signal representing the predetermined number.

The keep call back device may be provided with a message transmitting portion 38 for notifying the called terminal 2 whether the telephone number of the calling terminal 1 is registered in the incoming telephone number list 35 or not.

The releasing of the first call by the call releasing portion 34 is preferably performed immediately before the toll is incremented.

Figure 2:
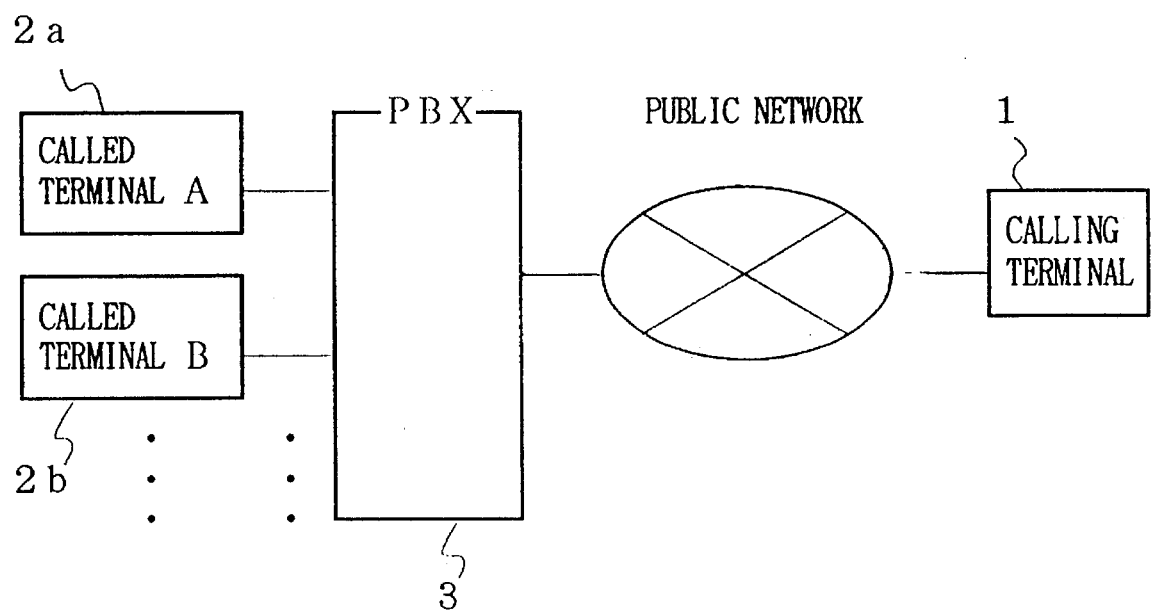
FIG. 2 schematically illustrates a communication network in a second embodiment of the present invention.

FIG. 2 schematically illustrates a communication network to which a keep call back device according to a second embodiment of the present invention is to be applied.

In this second embodiment, called terminals 2 (called terminals A (2a), called terminal B (2b), etc.) are connected to a private branch exchange (hereinafter referred to as PBX) 3, and this PBX 3 and a calling terminal 1 are connected over a public telephone network.

Two communication channels can be set between the PBX 3 and the called terminals 2 while a plurality of communication channels can be set between the PBX 3 and the public network.

The calling terminal 1 has a call waiting function which allows the terminal to respond to a call from one terminal without ending communication with another terminal during communication with another terminal.

Upon receipt of a call from the calling terminal 1, the PBX 3 determines whether the call is placed to the called terminal A (2a) or called terminal B (2b) and, if the called terminal A (2a) or B (2b) is unoccupied, allows the call to be received.

Figure 3:
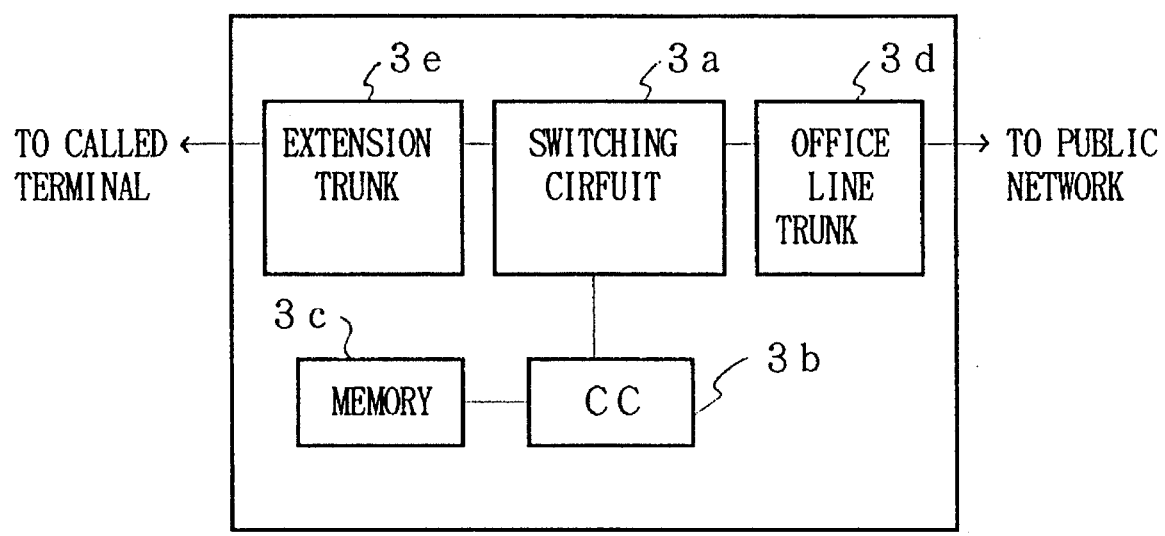
FIG. 3 shows a hardware of a PBX in the second embodiment of the present invention.

FIG. 3 shows a hardware configuration of the PBX 3.

The PBX 3 is equipped with an extension trunk 3e, a switching circuit 3a, an office line trunk 3d, a memory 3c and a central controller (CC) 3b. The keep call back device according to the present invention is a device which is realized as a result of the execution of a program stored in the memory 3c by the central controller (CC) 3b.

The configuration of the keep call back device according to this second embodiment will now be described.

Figure 4:
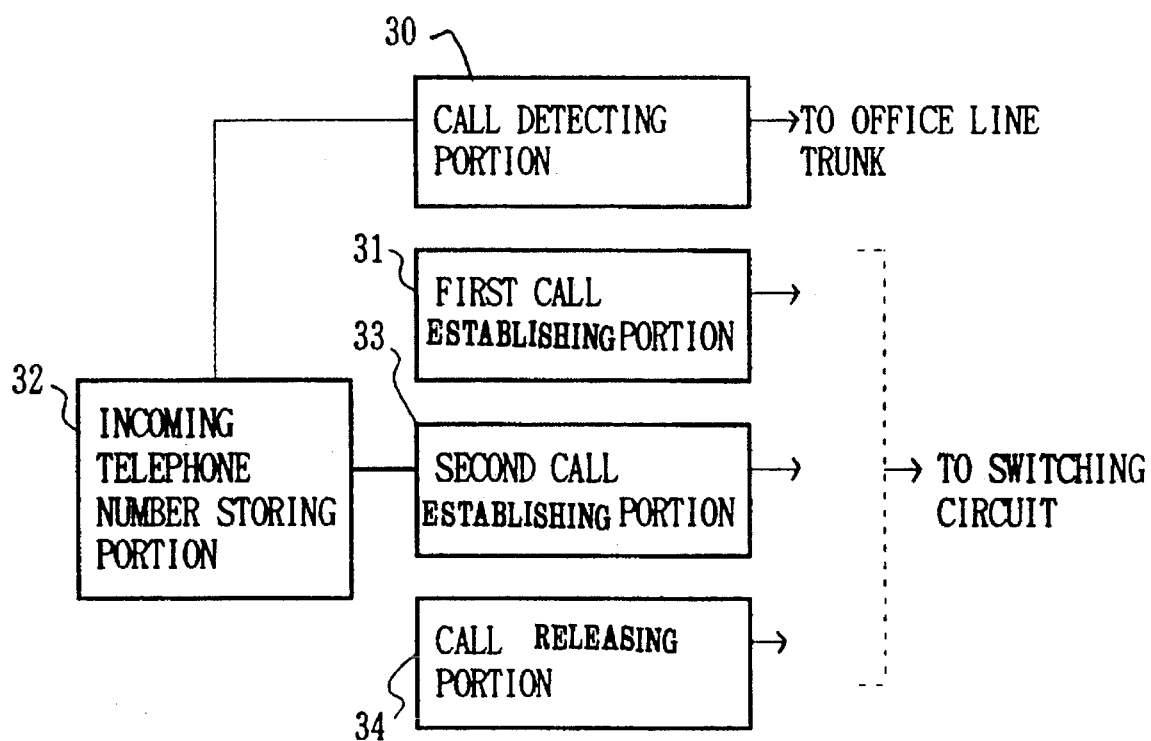
FIG. 4 is a block diagram illustrating each function of a keep call back device according to a second embodiment of the present invention.

The functional configuration of the keep call back device according to the second embodiment will be described with reference to FIG. 4.

The keep call back device is equipped with a call detecting portion 30, a first call establishing portion 31, a second call establishing portion 33 and an incoming telephone number storing portion 32.

The call detecting portion 30 has a function of detecting a call to the called terminal 2 (hereinafter referred to as first call) by monitoring the office line trunk 3d and a function of determining whether or not the first call includes a call back request signal.

In this second embodiment, a subscriber who wishes to be called back transmits the telephone number of his or her own terminal from the calling terminal 1 along with the first call. In response to this, the call detecting portion 30 determines whether or not the first call received at the office line trunk 3d is added with the telephone number of the calling terminal 1 to determine whether it is a call requesting a call back or it is a normal call.

When the call detecting portion 30 detects the first call, the first call establishing portion 31 activates the switching circuit 3a to cause the called terminal A (2a) or called terminal B (2b) to receive the first call (see FIG. 5).

The incoming telephone number storing portion 32 is for registering the telephone numbers of parties who request calling back, such telephone numbers being registered by the call detecting portion 30. The call detecting portion 30 detects the telephone number of the calling terminal 1 from the first call received at the office line trunk 3d and stores this telephone number to the incoming telephone number storing portion 32.

The second call establishing portion 33 has a function of placing a call to the calling terminal 1 (hereinafter referred to as second call) according to the telephone number stored in the incoming telephone number storing portion 32. The transmission of the second call is performed over a communication channel which is different from that for the first call (see FIG. 6). In addition, the second call establishing portion 33 has a retry function which allows a call to be placed again at a predetermined time interval after the call is first rejected for reasons such as the fact that calling terminal 1 is busy.

The call releasing portion 34 has a function of disestablishing the first call by controlling the switching circuit 3a when two communication lines have been established between the calling terminal 1 and the called terminal 2 (see FIG. 7).

Figure 8:
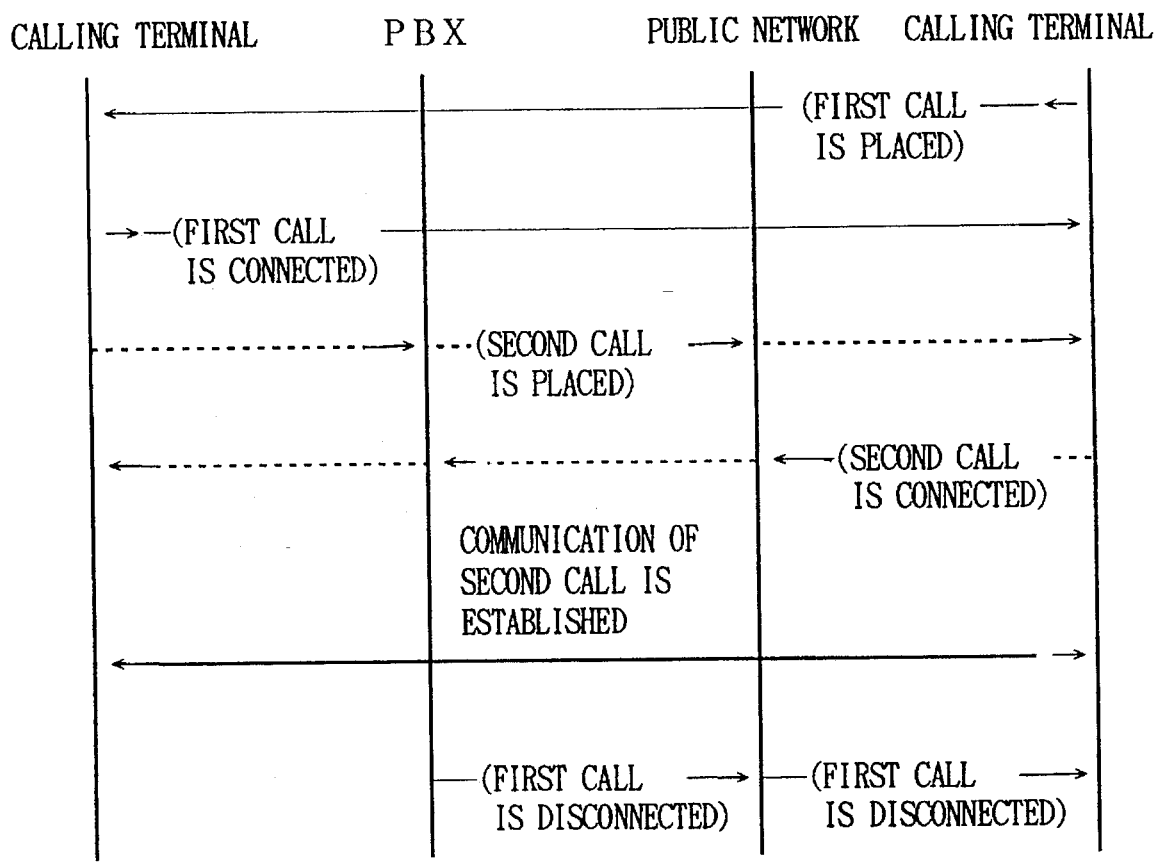
FIG. 8 is a sequence diagram illustrating a call establishing step in the second embodiment.

FIG. 8 is a sequence diagram illustrating the call back process in the second embodiment.

When the calling terminal 1 transmits the first call along with its telephone number to the called terminal 2, the public network analyzes the first call to identify the called terminal 2. Then, the public network transmits the first call to the PBX 3 to which the called terminal 2 is connected.

Upon receipt of the first call, the PBX 3 recognizes that this call is a call requesting calling back and connects this first call to the called terminal 2.

After the first call is connected to the called terminal 2, the keep call back device in the PBX 3 transmits the second call to the calling terminal 1.

At this time, the public network checks whether the calling terminal 1 has the call waiting function or not and transmits a ringing tone over the communication line between the called terminal A (2a) (or the called terminal B (2b)) and the calling terminal 1. It releases the first call when the calling terminal 1 responds to the second call with the called terminal A (2a) (or the called terminal B (2B)) kept waiting. As a result, the calling and called subscribers can communicate using the second call. The first call is preferably released when the toll is incremented.

The operational steps of the keep call back device in the second embodiment will now be described.

Figure 9:
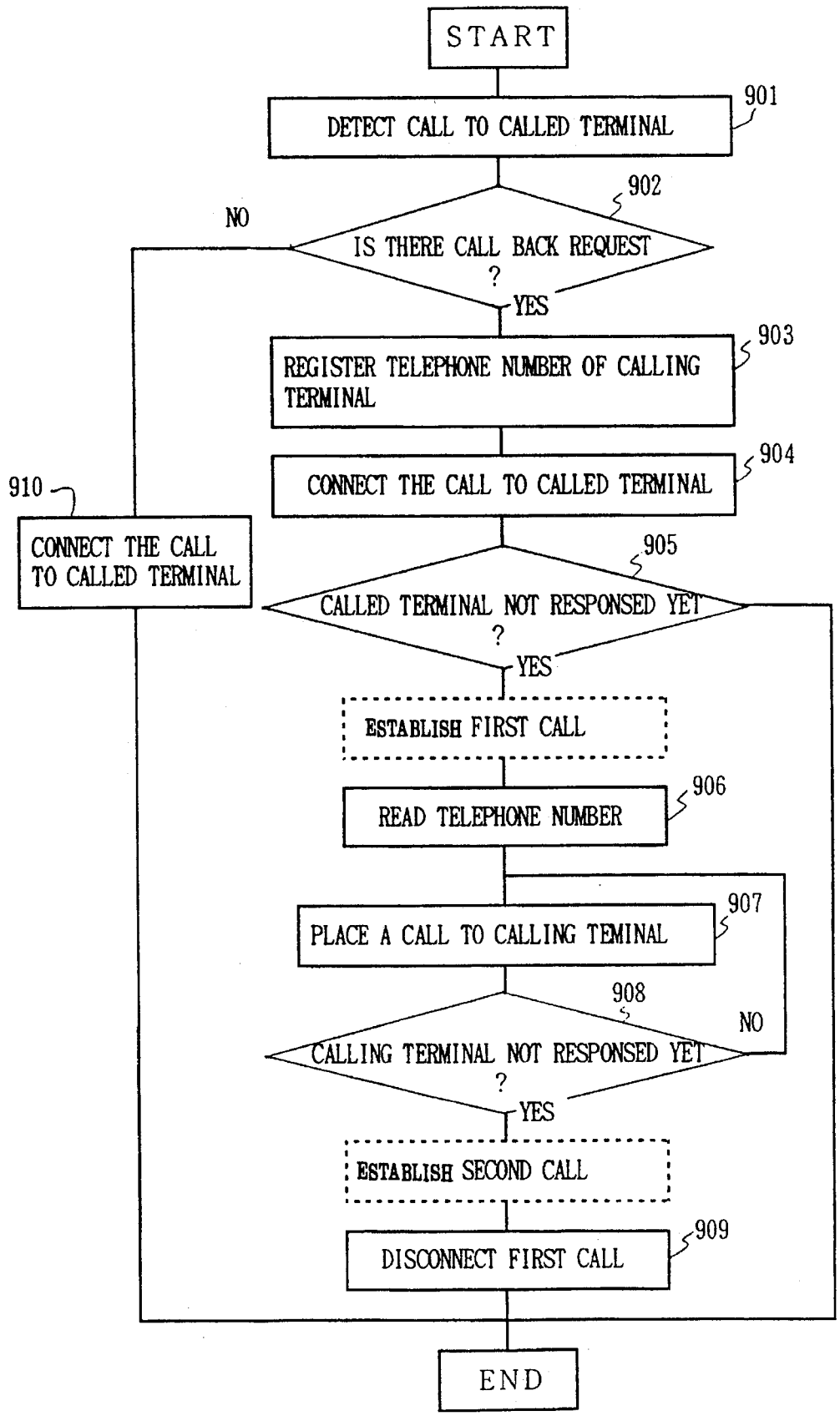
FIG. 9 is a flow chart illustrating the operation of the keep call back device in the second embodiment.

FIG. 9 is a flow chart showing the operational steps of the keep call back device in the second embodiment.

The call detecting portion 30 normally monitors the office line trunk 3d and, upon detection of a call to the called terminal A (2a) or called terminal B (2b) (step 901), determines whether or not the call is added with the telephone number of the calling terminal 1 (step 902).

If the call is added with the telephone number, the call detecting portion 30 registers the telephone number in the incoming telephone number storing portion 32 (step 903), notifies the first call establishing portion 131 of the occurrence of the call, and notifies the second call establishing portion 33 of the occurrence of the keep call back request.

The first call establishing portion 31 controls the switching circuit 3a to connect the call to the called terminal A (2a) or called terminal B (2b) (step 904).

When the called terminal A (2a) or called terminal B (2b) responds to the call, a first call is established, and communication is started between the calling terminal 1 and the called terminal A (2a) or called terminal B (2b).

Next, the second call establishing portion 33 recognizes the setting of the first call, reads the telephone number of the calling terminal 1 from the incoming telephone number storing portion 32 and transmits a second call based on that telephone number (step 907).

When the calling terminal 1 responds to the second call using the call waiting function, the second call is established to provide communication between the calling terminal 1 and the called terminal A (2a) or called terminal B (2b) (steps 908 and 909).

The call releasing portion 34 confirms the connection of the second call and thereafter releases the first call by controlling the switching circuit 3a when it detects the timing at which the toll is incremented for the next time (step 909).

If the calling terminal 1 does not respond to the second call at step 908, the second call establishing portion 33 retries the transmission of the second call at predetermined time intervals. Such retry is repeated until the calling terminal 1 responds or until the calling terminal 1 disconnects the first call.

If it is determined at step 902 that the first call transmitted by the calling terminal 1 is not added with the telephone number of the calling terminal 1, the call detecting portion 30 notifies only the first call establishing portion 31 of the occurrence of the call. The first call establishing portion 31 recognizes the occurrence of the first call and controls the switching circuit 3a to connect the first call to the called terminal A (2a) or called terminal B (2b) (step 910).

As described above, the second embodiment allows a call back process without the need for complicated operations at calling and called subscribers. It is therefore possible to charge the cost required for communication between the calling terminal 1 and the called terminal A (2a) (or called terminal B (2b)) to the called terminal A (2a) (or called terminal B (2b)).

Although the first call is disconnected by the keep call back device in this second embodiment, it may be disconnected by the called terminal A (2a) (or called terminal B (2b)).

Figure 10:
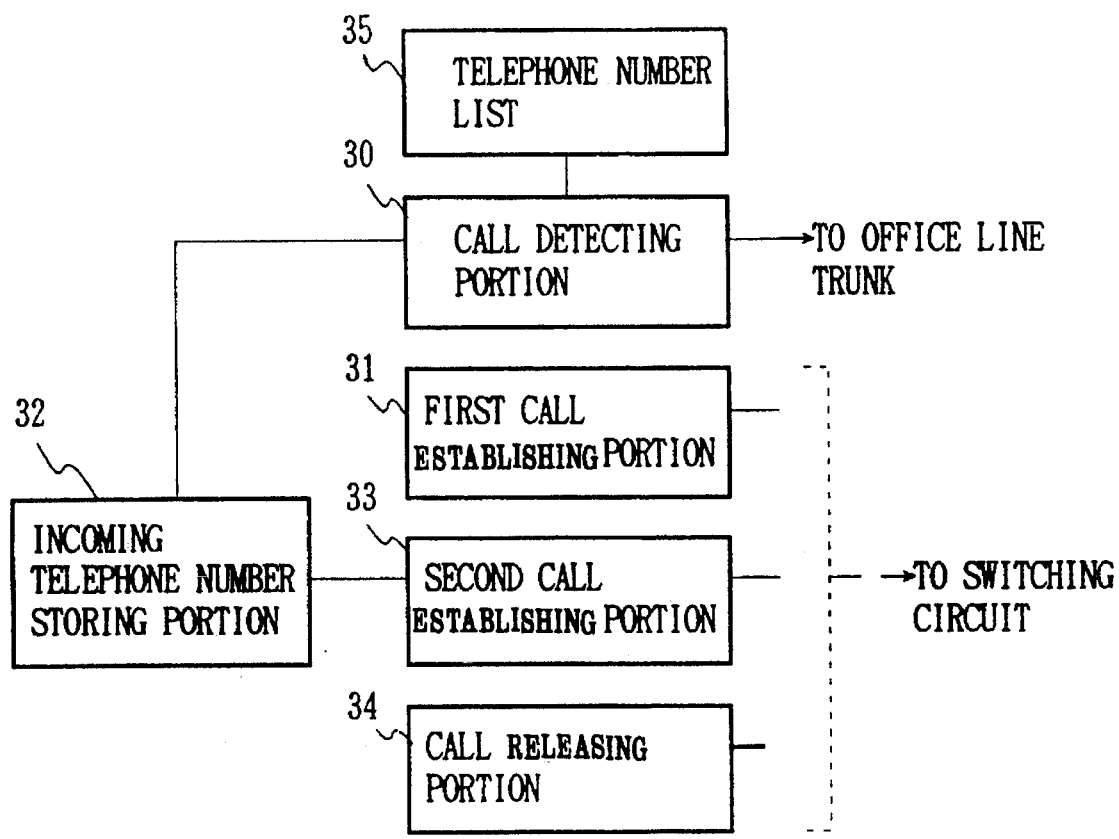
FIG. 10 is a block diagram showing each function of a keep call back device according to a third embodiment of the present invention.
Figure 11:
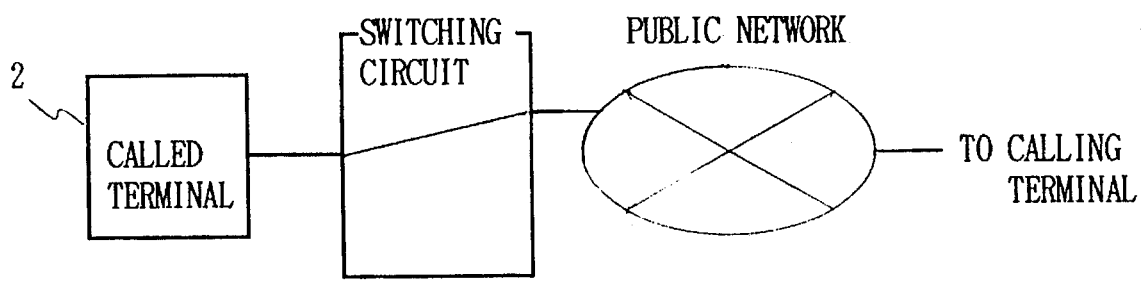
FIG. 11 shows a first example of the operation of a switching circuit in a fourth embodiment of the present invention.

FIG. 10 shows a configuration of a keep call back device according to a third embodiment of the present invention.

The keep call back device in this third embodiment is equipped with a telephone number list 35 in addition to the configuration in the second embodiment.

The telephone number list 35 is for registering the telephone numbers of subscribers who are to be allowed to make a call back request. The telephone number list 35 is provided on the memory 3c of the PBX 3.

In response to the addition of the telephone number list 35, the call detecting portion 30 is added with a function of determining whether the telephone number of a party making a call back request is registered in the telephone number list 35 or not when the request is received. Only if the telephone number of the requesting party is registered in the telephone number list, the call detecting portion 30 notifies the second call establishing portion 33 of the occurrence of the call back request.

Therefore, according to this third embodiment, only calling subscribers who are registered in advance can be called back, and illegal call back requests can be eliminated.

According to a fourth embodiment of the present invention, only one communication channel can be established between the PBX 3 and the called terminals 2.

Figure 12:
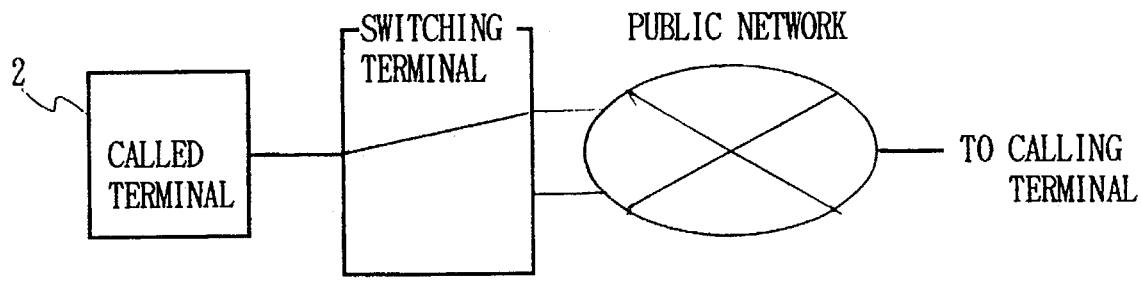
FIG. 12 shows a second example of the operation of the switching circuit in a fourth embodiment of the present invention.

In this case, after a first call is established between the calling terminal 1 and the called terminal A (2a) (or called terminal B (2b)) by the first call establishing portion 31, the second call establishing portion 33 transmits a second call from the PBX 3 to the calling terminal 1 (see FIG. 12). A communication channel which is different from that for the first call is used between the PBX 3 and the public network.

Figure 13:
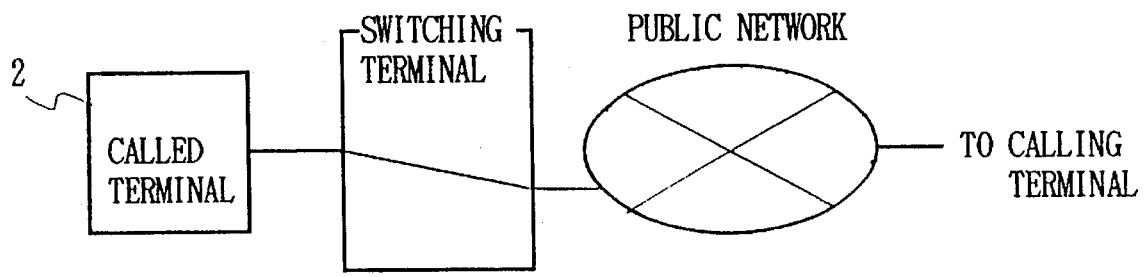
FIG. 13 shows a third example of the operation of the switching circuit in a fourth embodiment of the present invention.

In addition, when the calling terminal 1 responds to the second call, the call releasing portion 34 controls the switching circuit 3a to disconnect the first call from the called terminal A (2a) (or called terminal B (2b)) and, at the same time, connects the second call to the called terminal A (2a) (or called terminal B (2b)) (see FIG. 13).

The configuration is otherwise the same as that in the above-described second and third embodiments and will not be described.

Figure 14:
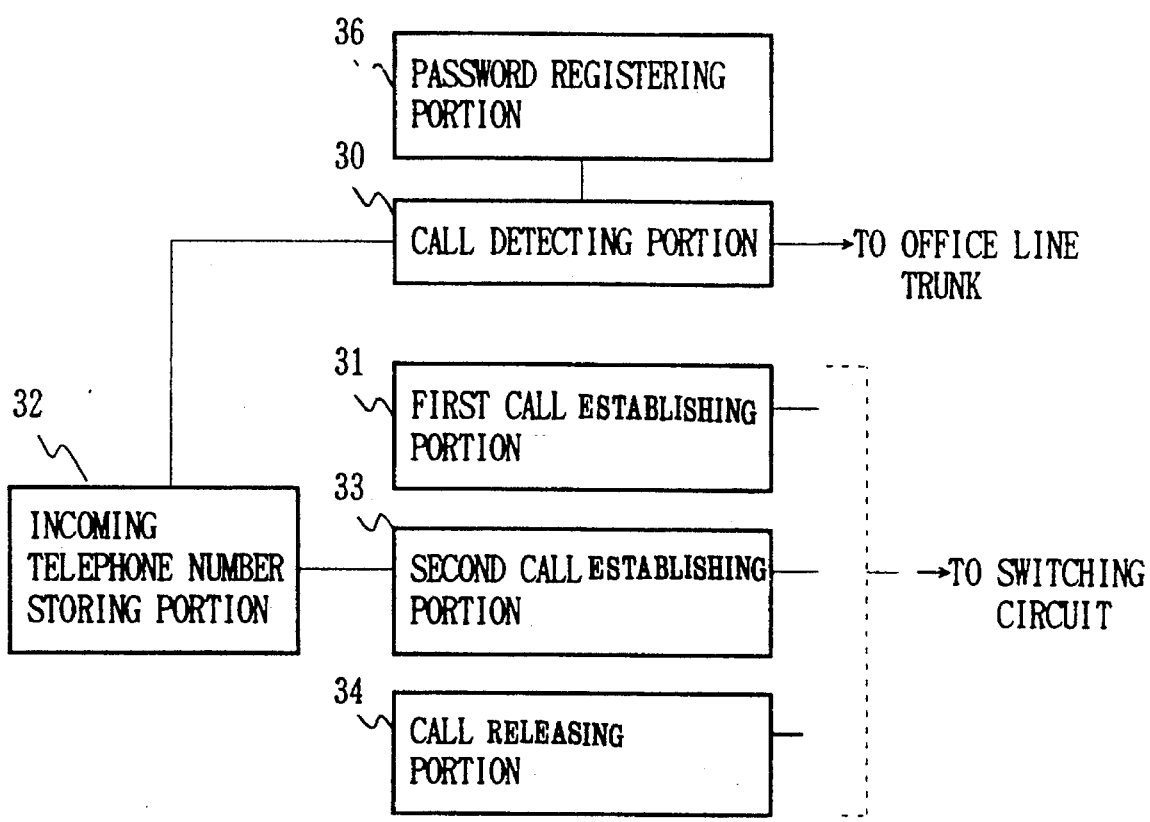

FIG. 14 shows a configuration of a keep call back device according to a fifth embodiment of the present invention.

The keep call back device in this fifth embodiment is equipped with a password registering portion 36 instead of the telephone number list 35 in addition to the configuration of the above-described second embodiment. Although the telephone number of the calling terminal 1 is used as information for recognizing the calling subscriber in the second embodiment, a password is used as information for identifying each calling subscriber in this fifth embodiment. Specifically, although a party who makes call back requests must always place calls from the same terminal in the second embodiment, this fifth embodiment allows a subscriber to make a call back request from any terminal as long as the terminal used has the call waiting function.

In this case, the calling terminal 1 transmits a call establishing request signal along with its own password when requesting a call back.

When the call detecting portion 30 recognizes the call from the calling terminal 1, it determines whether the call is added with a password. If a password is added, the call detecting portion 30 determines whether or not the password is registered in the password registering portion 36. If yes, it notifies the first call establishing portion 31 of the occurrence of the call and, at the same time, notifies the second call establishing portion 33 of the occurrence of the call back request. The subsequent processes are the same as those in the second embodiment and will not be described.

FIG. 15 shows a configuration of a keep call back device according to a sixth embodiment of the present invention.

The keep call back device in this sixth embodiment is equipped with a dial signal analyzing portion 37 in addition to the configuration in the second embodiment.

The dial signal analyzing portion 37 monitors the extension trunk 3e to detect a call back request signal transmitted by the called terminal A (2a) (or called terminal B (2b)). In this embodiment, the call back request signal is a dial signal representing a particular number. Specifically, when a particular number is dialed with the called terminal A (2a) (or called terminal B (2b)) in communication utilizing the first call, the dial signal analyzing portion 37 detects the dial signal and activates the second call establishing portion 33. This allows the subscriber at the called terminal A (2a) (or called terminal B (2b)) to cause a call back as required.

Further, the keep call back device according to this sixth embodiment may be equipped with a message transmitting portion for notifying the called terminal A (2a) (or called terminal B (2b)) whether or not an incoming telephone number is registered in the telephone number list 35 or whether or not a password is registered in the password registering portion 36. The following methods may be used for such notification.

(1) A method wherein a lamp provided on the called terminal A (2a) (or called terminal B (2b)) is caused to blink (2) A method wherein a predetermined tone is sent over the communication line between the called terminal A (2a) (or called terminal B (2b)) and the calling terminal 1

(3) A method wherein a display is provided on the called terminal A (2a) (or called terminal B (2b) and the keep call back device is added with a function of transmitting character information to notify whether a telephone number or password is registered or not.

As described above, the present embodiment allows a called terminal to share the toll which is otherwise charged to the calling terminal. Further, illegal call back requests can be eliminated by providing the telephone number list 35 and password registering portion 36.

Although the present embodiment has been described as an example of the application of a keep call back device to a public telephone network, it may be applied to ISDN networks which are attracting attention as the next generation communication networks. In this case, since the telephone number of the calling terminal 1 is sent from the network to the PBX 3, the calling subscriber does not need to transmit the telephone number of his or her own terminal. So, a calling subscriber who wishes to be called back dials a predetermined number along with a call establishing request.

While specific illustrated embodiments have been shown and described, it will be appreciated by those skilled in the art that various modifications, changes and additions may be made to the invention without departing from the spirit and scope of the invention as set forth in the appended claims.

What is claimed is:

1. A keep call back device for use in telephone communication between subscribers, the keep call back device comprising:

a first call establishing means for establishing a first call by establishing a call received from a calling terminal to a called terminal, wherein the calling terminal can respond to a call from one terminal without ending communication with another terminal during communication with said another terminal;

a second call establishing means for establishing a second call by placing a call to said calling terminal after said first call has been established and for connecting said second call between said calling terminal and said called terminal if said calling terminal responds to the call from the one terminal; and a call releasing means for releasing said first call by disconnecting said first terminal when said second call is established.

2. The keep call back device according to claim 1, further comprising:

a call detecting means for detecting a call to said called terminal and for determining a telephone number of the terminal which has placed the call; and an incoming telephone number storing means for registering the telephone number determined by said call detecting means, wherein:

said call detecting means detects a call to said called terminal, determines the telephone number of the calling terminal and registers the telephone number of the calling terminal in said incoming telephone number storing means;

said first call establishing means establishes the first call between said calling terminal and said called terminal;

said second call establishing means reads the telephone number of said calling terminal from said incoming telephone number storing means when the first call is established and establishes the second call between said calling terminal and said called terminal based on said telephone number; and said call releasing means releases said first call when it confirms that said second call has been established.

3. The keep call back device according to claim 2, further comprising an incoming telephone number list in which telephone numbers of specific calling terminals are registered, wherein:

said call detecting means detects a call to said called terminal, determines the telephone number of the terminal which has placed the call, checks up said incoming telephone number list to determine whether or not said telephone number is registered and, if said telephone number is registered, registers said telephone number in said incoming telephone number storing means; and said second call establishing means establishes the second call between said calling terminal and said called terminal only when said telephone number is registered in said incoming telephone number storing means.

4. The keep call back device according to claim 2, further comprising a subscriber identification information registering means for registering calling subscriber identification information for identifying calling subscribers, wherein:

said call detecting means detects a call to said called terminal, determines the calling subscriber identification information to identify a subscriber who has placed the call, checks up said subscriber number identification information registering means to determine whether or not said calling subscriber identification information is registered and, if said calling subscriber identification information is registered, registers the telephone number of the calling terminal which has placed said call in said incoming telephone number storing means; and said second call establishing means establishes the second call between said calling terminal and said called terminal only when said telephone number is registered in said incoming telephone number storing means.

5. The keep call back device according to claim 3, further comprising a message transmitting means for notifying said called terminal whether or not said telephone number of the calling terminal is registered in said incoming telephone number list.

6. The keep call back device according to claim 4, further comprising a message transmitting means for notifying said called terminal whether or not said calling subscriber identification information of said calling subscriber is registered in said subscriber identification information registering means.

7. The keep call back device according to claim 1, wherein said second call establishing means establishes the second call between said calling terminal and said called terminal only when said second call establishing means receives a request for establishing the second call from said calling terminal.

8. The keep call back device according to claim 7, wherein said request for establishing the second call is a dial signal representing a predetermined number; and further comprising a dial signal analyzing means for monitoring signals transmitted by said calling terminal and for activating said second call establishing means when the dial signal representing the predetermined number is detected.

9. The keep call back device according to claim 1, wherein said call releasing means releases the call established by said first call establishing means immediately before a toll is incremented.

* * * * *